United States Patent
Miyazaki

(10) Patent No.: US 7,562,683 B2
(45) Date of Patent: Jul. 21, 2009

(54) PNEUMATIC TIRE WITH TREAD HAVING BLOCKS AND BRIDGE PORTIONS

(75) Inventor: Tetsuji Miyazaki, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 253 days.

(21) Appl. No.: 11/287,538

(22) Filed: Nov. 23, 2005

(65) Prior Publication Data

US 2006/0108040 A1 May 25, 2006

(30) Foreign Application Priority Data

Nov. 25, 2004 (JP) .............................. 2004-339929

(51) Int. Cl.
*B60C 11/11* (2006.01)
(52) U.S. Cl. ............................ 152/209.15; 152/209.18; 152/209.22; 152/902
(58) Field of Classification Search ............ 152/209.15, 152/209.18, 209.22, 902
See application file for complete search history.

(56) References Cited

U.S. PATENT DOCUMENTS

| 979,961 | A | * | 12/1910 | Keaton ................... 152/209.19 |
| 1,504,694 | A | * | 8/1924 | Litchfield ............... 152/209.22 |
| D85,055 | S | * | 9/1931 | Reichard ................ 152/209.22 |
| 4,690,189 | A | * | 9/1987 | Bradisse et al. ........ 152/209.15 |
| 5,256,221 | A | * | 10/1993 | Trabandt ............... 152/209.22 |
| 5,814,169 | A | * | 9/1998 | Yamaguchi et al. .... 152/209.22 |

FOREIGN PATENT DOCUMENTS

| EP | 855291 | * | 7/1998 |
| JP | 2001-225611 | * | 8/2001 |
| JP | 2003-165308 | * | 6/2003 |
| JP | 2003-326920 A | | 11/2003 |

OTHER PUBLICATIONS

The Office Action issued by Chinese Patent Office against corresponding Chinese Patent Application No. 200510118628.2.

* cited by examiner

*Primary Examiner*—Steven D Maki
(74) *Attorney, Agent, or Firm*—Knobbe Martens Olson & Bear LLP

(57) ABSTRACT

It is an object of the present invention to provide a pneumatic tire capable of securing rigidity of a tip end of a block, and effectively preventing deviated wear of a tread surface. In a tread surface of a pneumatic tire formed with a block 30 having a tip end 31 which is tapered as viewed from above, and a block 20 having a sidewall surface 25 opposed to a sidewall surface 32 of the block 30, the tip end 31 of the block 30 is provided with a taper cut portion 33 whose land portion height is gradually reduced toward its tip end side, and a bridge portion 34 which is connected to the sidewall surface 25 of the block 20 at a substantially constant land portion height from the tip end of the taper cut portion 33.

13 Claims, 3 Drawing Sheets

Background Art

PNEUMATIC TIRE WITH TREAD HAVING BLOCKS AND BRIDGE PORTIONS

BACKGROUND OF THE INVENTION

1. Field of the Invention

The present invention relates to a pneumatic tire whose tread surface is formed with a block line comprising a plurality of blocks.

2. Description of the Related Art

Usually various tread patterns are formed on tread surfaces of pneumatic tires in accordance with required tire performance and using condition. Among the various tread patterns, a tread pattern called block type has a plurality of blocks divided by a plurality of grooves, and this tread pattern is known as one having excellent snow-covered road performance, drainage performance and traction performance.

FIG. 6 is a plan view showing one example of a conventional block type tread pattern. A tread surface 16 is formed with circumferential grooves 9 extending in the circumferential direction of the tire, inclined grooves 10 and inclined grooves 11 extending obliquely with respect to the circumferential direction of the tire, and block lines 19 in which a plurality of blocks 17 divided by the circumferential grooves 9 and the inclined grooves 10 and 11 are arranged. Each block 17 includes a tip end 18 which is tapered as viewed from above, and the tip end 18 is disposed between slits formed by the blocks 17 on opposite sides.

As shown in FIG. 7, the tip end 18 of the block 17 is formed with a taper cut portion 15 whose land portion height is gradually reduced toward the tip end side. The taper cut portion 15 is formed to solve a problem that the tip end 18 has small rigidity and it is prone to fall and the tip end 18 has relatively small ground pressure, the tip end 18 has small amount of wear as compared with other portions, so that the deviated wear is prone to be generated in the tread surface 16. By forming the taper cut portion 15, the wear amount difference is compensated to suppress the deviated wear.

According to the taper cut portion 15, however, it is not possible to sufficiently prevent the deviated wear from being generated. Especially when the angle of the tip end 18 is small, it is necessary to form a taper cut portion 15 having a great gradient, deviated wear resistance is not sufficient. Further, as shown in FIG. 6, if the tip end 18 is formed with the taper cut portion 15, a space provided between the slits becomes large, and there is a problem that deviated wear is easily generated along the circumferential direction of the tire in this region.

The following Japanese Patent Application Laid-open No. 2003-326920 discloses a pneumatic tire in which a tip end of the block is formed with a chamfered portion (corresponding to the taper cut portion). As the chamfered portion, there are described a first chamfered portion surrounded by a groove, and a second chamfered portion which is adjacent to a sidewall of the block. However, the first chamfered portion does not sufficiently prevent the deviated wear as described above. Further, in the second chamfered portion, since its inclined surface reaches the groove bottom, the rigidity of the tip end becomes excessively small, and the deviated wear resistance is not sufficient.

SUMMARY OF THE INVENTION

It is an object of the present invention to provide a pneumatic tire capable of securing rigidity of a tip end of a block, and effectively preventing deviated wear of a tread surface.

The above object can be achieved by the present invention having the following structure. That is, in a pneumatic tire of the present invention formed at its tread surface with a block line comprising a plurality of substantial blocks, the block line comprises a first substantial block having a tip end which is tapered as viewed from above, and a second substantial block having a sidewall surface opposed to a sidewall surface of a tip end of the first substantial block, the tip end of the first substantial block is formed with a taper cut portion whose land portion height is gradually reduced toward the tip end side, and a bridge portion which is connected to the sidewall surface of the second substantial block at a substantially constant land portion height from a tip end of the taper cut portion.

According to the above structure, the first substantial block having the tip end which is tapered as viewed from above includes the taper cut portion whose land portion height is gradually reduced toward the tip end side. Therefore, it is possible to compensate the difference in the wear amount caused by rigidity difference between the tip end and the other portion, and it is possible to suppress the deviated wear. Further, the first substantial block includes the bridge portion which is connected to the sidewall surface of the second substantial block at a substantially constant land portion height from the tip end of the taper cut portion. Thus, the rigidity of the tip end is secured. With this, even if the angle of the tip end is small and the gradient of the taper cut portion is great, the rigidity of the tip end does not become excessively small, and it is possible to sufficiently prevent the deviated wear from being generated.

Here, the substantial block is not limited to a block which is completely divided by a groove, and the substantial block also includes a block which has a portion connected to a sidewall surface of another block such as the bridge portion and which is not completely divided by a groove.

In the above pneumatic tire, it is preferable that the bridge portion is bifurcated from the tip end of the taper cut portion and connected to the sidewall surface of the second substantial block disposed on opposite sides of the tip end of the first substantial block.

According to the above structure, since the bridge portion is bifurcated from the tip end of the taper cut portion and connected to the sidewall surface of the second substantial block disposed on opposite sides of the tip end of the first substantial block, the rigidity of the tip end is more effectively secured. With this, it is possible to more sufficiently prevent the deviated wear from being generated.

In the above pneumatic tire, it is preferable that when a portion of the taper cut portion that is connected to the bridge portion is defined as a root, a width of the root is 2 mm or more.

According to the above structure, since the width of the root of the taper cut portion connected to the bridge portion is 2 mm or more, the root of the taper cut portion connected to the bridge portion does not become excessively thin, the rigidity of the tip end of the first substantial block is more effectively secured, and it is possible to more sufficiently prevent the deviated wear from being generated.

DESCRIPTION OF THE PREFERRED EXAMPLES

An embodiment of the present invention will be explained with reference to the drawings. The pneumatic tire of this invention has the same structure of the publicly known conventional tire except the tread surface, and is the same as that shown in FIG. 1 for example.

Figure 1:
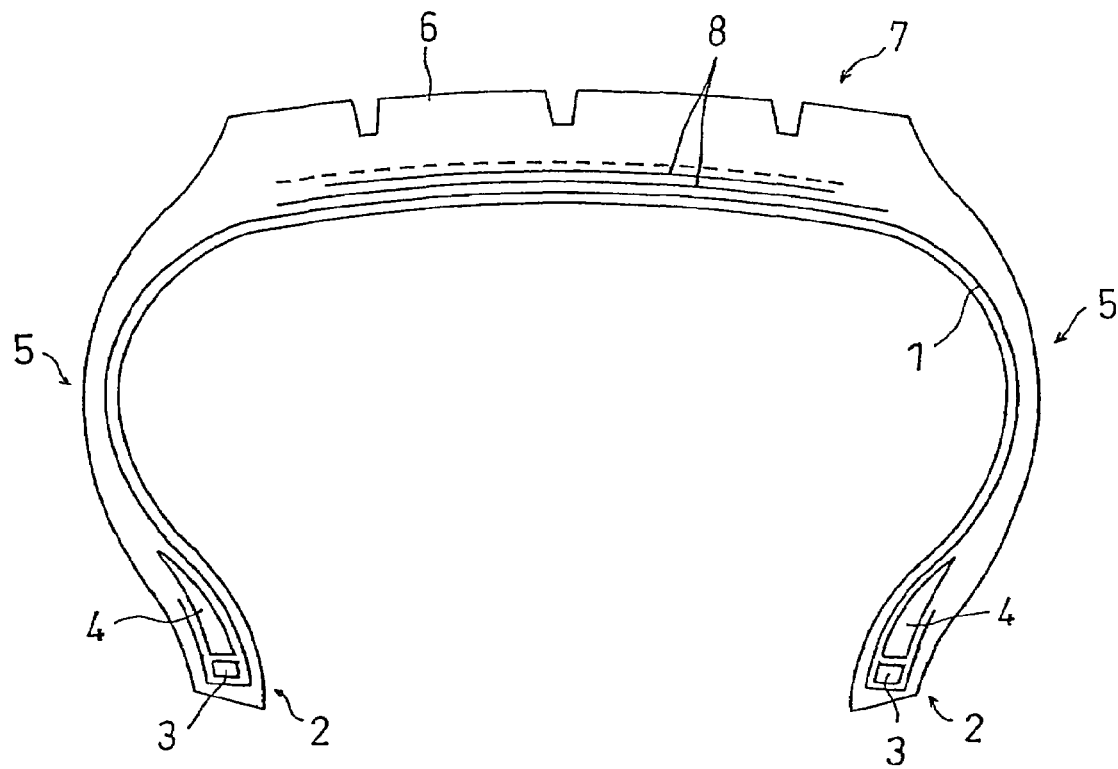
FIG. 1 is a sectional view of a tire meridian showing one example of a pneumatic tire of the present invention.

The pneumatic tire shown in FIG. 1 includes a pair of annular bead portions 2, sidewall portions 5 extending from the bead portions 2 toward outer peripheral side of the tire, respectively, and a tread portion 7 connected to the outer peripheral ends of the sidewall portions 5 through shoulder portions. A carcass ply 1 is provided between the bead portions 2 such that ends of the carcass ply 1 are wound up to sandwich a bead 3 and a bead filler 4. One or more belt layers 8 are disposed on the outer side of the carcass ply 1 of the tread portion 7, and a belt reinforcing layer is disposed if necessary. A tread rubber is disposed on the belt layer 8 on the outer peripheral side of the tire. Various tread patterns are formed on tread surface 6 in accordance with required tire performance and using condition.

Examples of raw material rubbers for the rubber layer and the like are natural rubber, styrene-butadiene rubber (SBR), butadiene rubber (BR), isoprene rubber (IR), butyl rubber (IIR) and the like. These rubbers are used alone or a combination thereof. These rubbers are reinforced using filler such as carbon black and silica, and cure, accelerator, plasticizer, antioxidant or the like is appropriately mixed.

Figure 2:
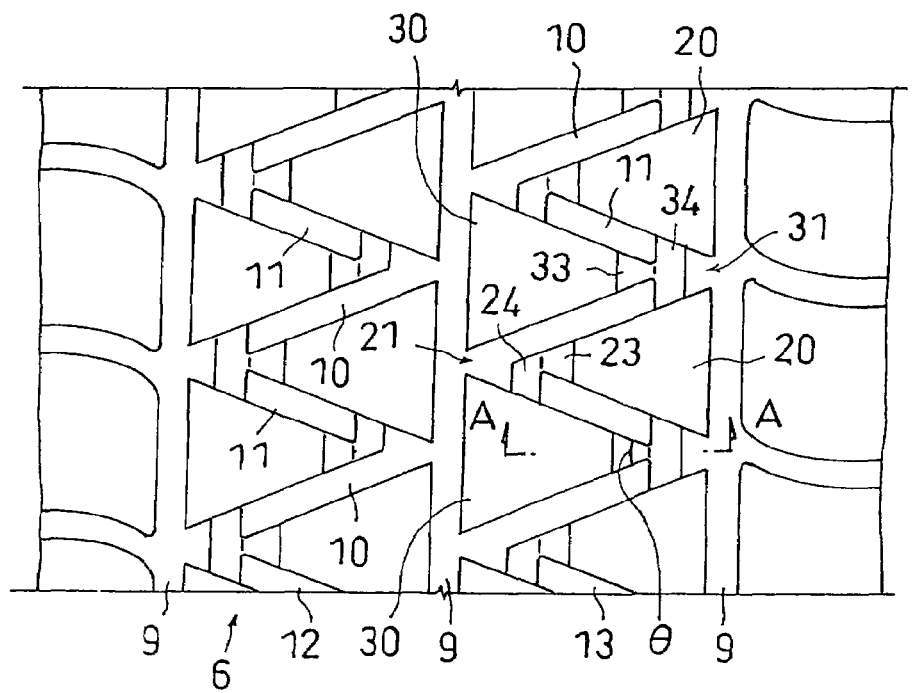
FIG. 2 is a plan view showing one example of a tread portion of the pneumatic tire of the present invention.
Figure 3:
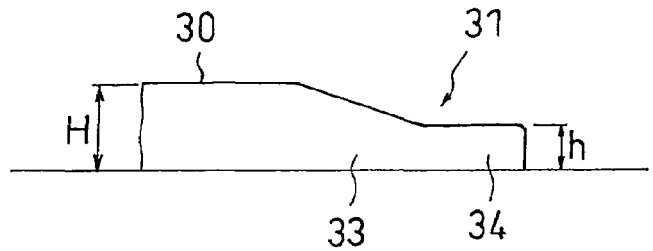
FIG. 3 is a sectional view taken along the line A-A in FIG. 2.
Figure 4:
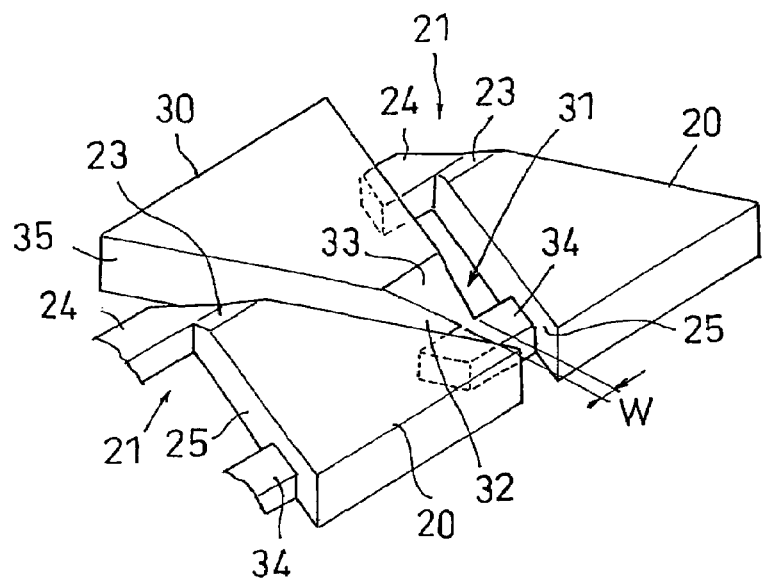
FIG. 4 is a perspective view of an essential portion of a tread surface.

The tread surface of the pneumatic tire according to the present invention will be explained. FIG. 2 is a plan view showing one example of the tread surface of the pneumatic tire. FIG. 3 is a sectional view taken along the line A-A in FIG. 2. FIG. 4 is a perspective view of an essential portion of the tread surface.

The tread surface 6 is formed with three circumferential grooves 9 extending in the circumferential direction of the tire, inclined grooves 10 extending diagonally in the circumferential direction of the tire, and inclined grooves 11 extending in a direction intersecting with the inclined grooves 10 while inclining in the circumferential direction of the tire. Block lines 12 and 13 comprise a plurality of substantial blocks 20 and 30 (hereinafter, simply called blocks 20 and 30 in some cases) divided by the circumferential grooves 9, the inclined grooves 10 and the inclined grooves 11.

In this embodiment, the block lines 12 and 13 are formed in such a manner that the blocks 20 and the blocks 30 are alternately arranged at a predetermined pitch along the circumferential direction of the tire. The block 30 includes a tip end 31 which is tapered as viewed from above. The tip end 31 is disposed between the slits which are formed by the adjacent blocks 20. That is, the block 30 is disposed such that a sidewall surface 32 of the tip end 31 is opposed to a sidewall surface 25 of the block 20.

The tip end 31 of the block 30 is provided with a taper cut portion 33 whose land portion height is gradually reduced toward the tip end. By forming the taper cut portion, difference in wear amount caused by difference in rigidity between the tip end 31 and the other portion is compensated to suppress the deviated wear. Although the inclined surface of the taper cut portion 33 is a flat surface in this embodiment, the inclined surface may be a curved surface. The gradient of the taper cut portion 33 is not especially limited, and the gradient may appropriately be set in accordance with an angle and the like of the tip end 31. The angle of the tip end 31 is defined as an angle θ formed by the sidewall surface 32 of the tip end 31.

The tip end 31 of the block 30 is provided with a bridge portion 34 which is connected to the sidewall surface 25 of the block 20 at the substantially constant land portion height from the tip end of the taper cut portion 33. With this, even if the angle of the tip end 31 is small and the gradient of the taper cut portion 33 is large, the rigidity of the tip end 31 does not become excessively small, and it is possible to sufficiently prevent the deviated wear from being generated.

Here, the land portion height is a height as measured from the bottom surface of the groove (bottom surface of main groove when grooves having different depths such as main groove and auxiliary groove are formed). The land portion height h of the bridge portion 34 is preferably 10 to 60% of the land portion height H of the block 30, and more preferably 15 to 50%. If the land portion height h is less than 10%, it becomes difficult to secure the rigidity of the tip end 31. If the land portion height h exceeds 60%, water passing through the inclined grooves 10 and 11 is stopped, drainage performance is deteriorated, the bridge portion 34 becomes obvious, and design of the tread surface 6 is deteriorated.

In the present invention, like the block 30, it is preferable that the bridge portion 34 is bifurcated from the tip end of the taper cut portion 33 and is connected to the sidewall surfaces 25 of the block 20 disposed on the opposite sides of the tip end 31. With this, the rigidity of the tip end 31 is effectively secured, and it is possible to sufficiently prevent the deviated wear from being generated. In this embodiment, the slits formed by the adjacent blocks 20 are connected by the bridge portion 34 extending in the circumferential direction of the tire. Therefore, it is possible to effectively prevent the toe and heel wear in which a wear amount on the stepping side and a wear amount on the kicking side in the circumferential direction of the tire are different from each other.

Like the block 30, the block 20 is also formed with a tip end 21 which is tapered as viewed from above. The tip end 21 is provided with a taper cut portion 23 and a bridge portion 24. The bridge portion 24 is connected to a sidewall surface 35 of the block 30 at a substantially constant land portion height from a tip end of the taper cut portion 23. However, the bridge portion 24 is not bifurcated from the tip end of the taper cut portion 23, and is connected to the sidewall surface 35 located on one side of the tip end 21. Even with this structure, the rigidity of the tip end 21 is preferably secured.

According to this embodiment, as described above, the bridge portion 34 of the block 30 is connected to the sidewall surface 25 of the block 20, the block 30 corresponds to the first substantial block, and the block 20 corresponds to the second substantial block. When attention is paid to the tip end 21 of the block 20, however, since the bridge portion 24 is connected to the sidewall surface 35 of the block 30, the block 20 corresponds to the first substantial block and the block 30 corresponds to the second substantial block. According to the present invention, the first substantial block can be the second substantial block.

The taper cut portion 33 of the block 30 is connected to the bridge portion 34. If this connected portion is called a root, a width W of the root is preferably 2 mm or more in this invention. With this, the root of the taper cut portion 33 connected to the bridge portion 34 does not become excessively thin, the rigidity of the tip end 31 is effectively secured, and it is possible to sufficiently prevent the deviated wear from being generated. The same can be said for the root width of the block 20 also.

Generally, when the angle of the tip end of the block is small (degree of acute angle is large), it is necessary to form a taper cut portion having large gradient. Thus, the rigidity of the tip end is prone to be lowered, and there is a tendency that the deviated wear resistance is deteriorated. Therefore, the present invention is more effective when the angle of the tip end is smaller, and the invention is especially effective when the angle of the tip end is 40° or smaller.

ANOTHER EMBODIMENT (1) The tread surface of the pneumatic tire of the present invention is not especially limited only if the tread surface is formed with the plurality of blocks. The tread surface may have a block or pattern pitch which is different from that of the previous embodiment. Although the tip end of the block is formed with the taper cut portion and the bridge portion and the block is formed in the vicinity of the central portion of the tread surface 6 in the previous embodiment, the invention is not limited to this, and the block may be formed in the vicinity of the shoulder portion.

(2) Although an example of extending of the bridge portions 24 and 34 in the circumferential direction of the tire is shown in the previous embodiment, the extending direction of the bridge portion is not limited in the present invention, and the bridge portion may be extended in a direction inclined with respect to the circumferential direction of the tire.

Figure 5:
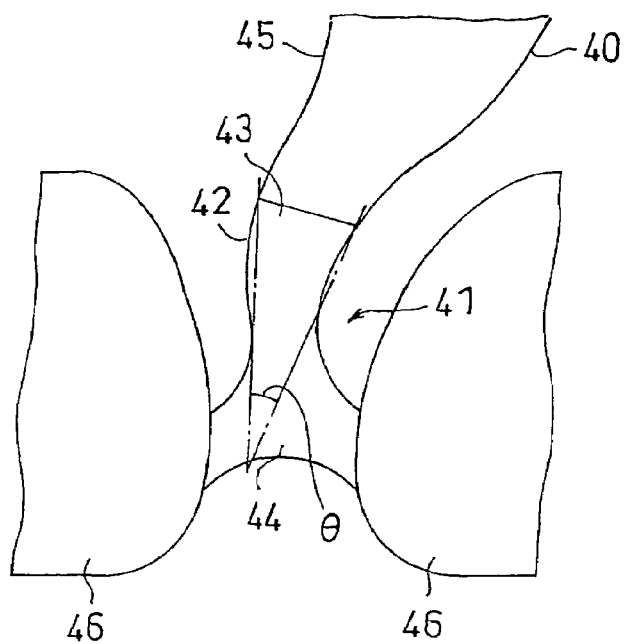
FIG. 5 is a plan view of an essential portion of the tread surface showing another embodiment of the present invention.

(3) FIG. 5 shows another embodiment of the present invention. A block 40 shown in FIG. 5 is different from that of the previous embodiment, and sidewall surfaces 42 and 45 are curved as viewed from above. In this case also, a tip end 41 of the block 40 is tapered as viewed from above, and the tip end 41 is formed with a taper cut portion 43 and a bridge portion 44. With this structure, it is possible to secure the rigidity of the tip end 41 and to prevent the deviated wear.

In this invention, the bridge portion may be bifurcated from the tip end of the taper cut portion, may be connected to the sidewall surfaces of the block. When the sidewall surface of the tip end is curved as viewed from above, the angle θ of the tip end can be defined as an angle formed by a straight line connecting a tip end and a rear end of the sidewall surface of the taper cut portion.

EXAMPLES

Next, to concretely show the structure and the effect of the present invention, the deviated wear resistance was evaluated. This evaluation will be explained below.

First, test tires of the following examples of the invention (tire size: LT265/75R16 6PR) were prepared, the tread surface of each tire was allowed to become worn equally in the circumferential direction of the tire until the height of the taper cut portion became half. Then, the test tires were mounted on an actual vehicle (4800cc four-wheel drive vehicle, and two passengers rode), air pressure was 350 kPa, and the vehicle was allowed to run 12,000 km through general road. After the running, an amount of step of every block generated due to wear was measured, and the deviated wear resistance was evaluated. Two tires were prepared for each specification.

Comparative Example

Figure 6:
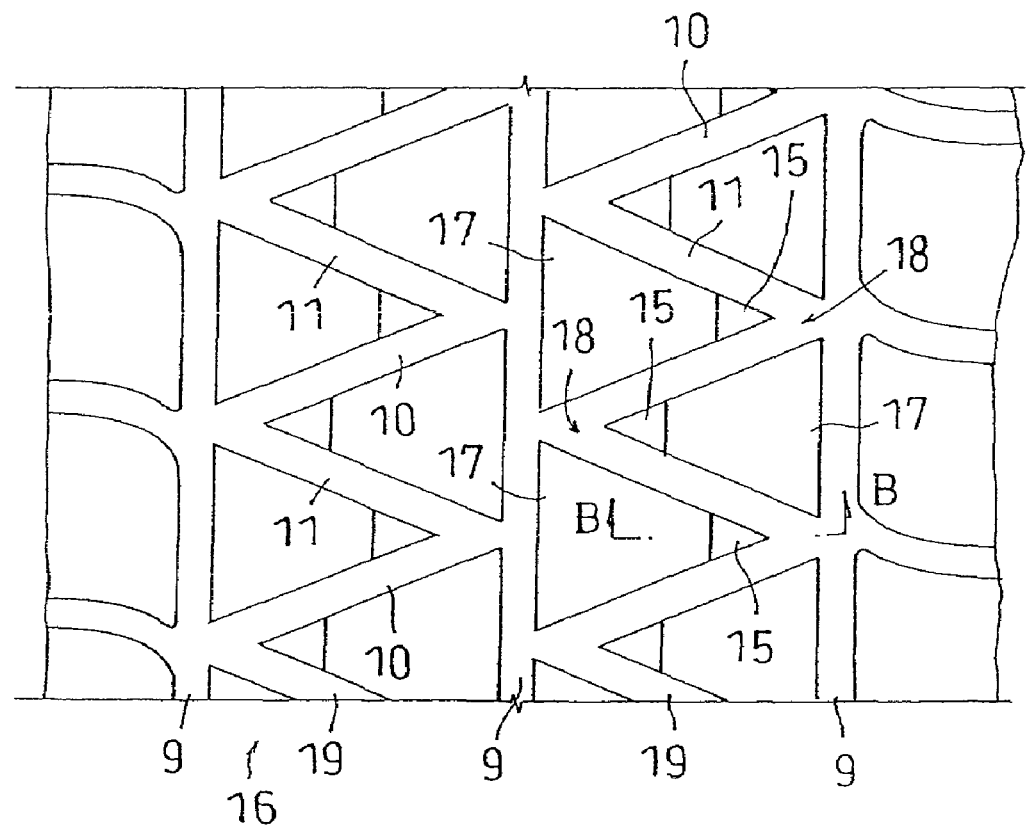
FIG. 6 is a plan view showing one example of a tread portion of a conventional pneumatic tire.
Figure 7:
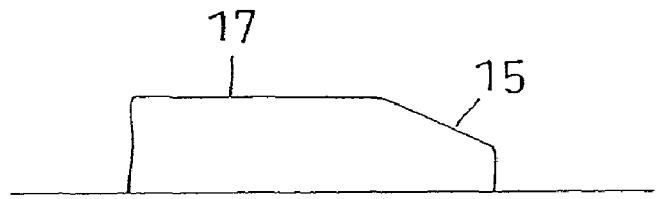
FIG. 7 is a sectional view taken along the line B-B in FIG. 6.

As shown in FIGS. 6 and 7, test tires each having block line comprising blocks formed at their tip ends with taper cut portions were prepared as comparative example. The land portion height of the tip end of the taper cut portion was 25% of the land portion height of the block.

Examples 1 and 2

As shown in FIGS. 2 to 4, test tires were prepared as the examples 1 and 2 of the invention. The test tires are the same as those of the comparative example except that the tread surface is formed with a block line comprising blocks formed at their tip ends with taper cut portions and bridge portions. The land portion height of the bridge portion is 25% of the land portion height of the block. In the example 1, the block formed on the tread surface is connected to a sidewall surface located one of sides of the tip end like the block 20 shown in FIGS. 2 and 4. In the example 2, the block formed on the tread surface is connected to the sidewall surfaces located on both sides of the tip end like the block 30 shown in FIGS. 2 to 4.

A result of evaluation is shown in Table 1.

TABLE 1

| | | Amount of step (mm) | |
|---|---|---|---|
| | Bridge portion | Minimum value | Maximum value |
| Comparative Example | No bridge portion | 1.6 | 2.0 |
| Example 1 | Bridge portion is connected to sidewall surface on one side | 0.9 | 1.4 |
| Example 2 | Bridge portion is connected to sidewall surfaces on both sides | 0.4 | 1.1 |

According to the result shown in Table 1, it can be found that the amounts of steps of the examples 1 and 2 are smaller than that of the comparative example, and the deviated wear resistance can be enhanced by forming the tip end of the block with the taper cut portion and the bridge portion. The amount of step of the example 2 is smaller than that of the example 1, and it can be found that if the bridge portion is connected to the sidewall surfaces located on both sides of the tip end, the rigidity of the tip end of the block is effectively secured and the deviated wear resistance is enhanced.

What is claimed is:

1. A pneumatic tire formed at its tread surface with a block line comprising a plurality of substantial blocks, wherein
the block line comprises a first substantial block having a tip end which is tapered as viewed from above, and a second substantial block on each side of the first substantial block having a sidewall surface opposed to a sidewall surface of a tip end of the first substantial block,
the tip end of the first substantial block is formed with a taper cut portion whose land portion height is gradually reduced toward the tip end side, and a bridge portion which is bifurcated from the tip end of the taper cut portion and is connected to the sidewall surface of the second substantial blocks disposed on each side at a substantially constant land portion height from a tip end of the taper cut portion, wherein the bridge portion has a height being 10-50% of the land portion height of the first substantial block, and wherein substantially the entire upper surface of the bridge portion, which extends between the second blocks and is connected on one side thereof to the tip end, is substantially parallel to the tread surface.

2. The pneumatic tire according to claim 1, wherein when a portion of the taper cut portion that is connected to the bridge portion is defined as a root, a width of the root is 2 mm or more.

3. The pneumatic tire according to claim 1, wherein the bridge portion is formed in such a manner that the bridge portion extends from the tip end in a direction perpendicular to the tapered direction of the first substantial block.

4. A pneumatic tire having a tread surface comprising:

a plurality of blocks formed on the tread surface and aligned in a circumferential direction of the tire, said aligned blocks being comprised of two types of blocks which are a first block and a second block, a first block having a shape with a tip end and having a taper cut portion at the tip end, wherein the first block has a land with a height H, and the taper cut portion has a height decreasing toward the tip end having a height h, wherein the height h is in a range of 10-50% of the height H, a second block disposed adjacent to both opposite sides of the first block and having a sidewall surface in the vicinity of the tip end of the first block; and a bridge portion bifurcated from the tip end of the taper cut portion, and connected between the tip end of the first block and the sidewall surface of the second block disposed on opposite sides of the first block, said bridge portion having a land portion with a substantially constant height equivalent to the height h, and wherein substantially the entire upper surface of the bridge portion, which extends between the second blocks and is connected on one side thereof to the tip end, is substantially parallel to the tread surface.

5. The pneumatic tire according to claim 4, wherein the bridge portion is aligned in the circumferential direction.

6. The pneumatic tire according to claim 4, wherein the taper cut portion at the tip end of the first block connected to the bridge portion has a width W of 2 mm or more.

7. The pneumatic tire according to claim 4, wherein the second block has a land having the height H.

8. The pneumatic tire according to claim 4, wherein the first block and the second block have the same general shape, wherein a tip end of the second block is directed opposite to the tip end of the first block.

9. The pneumatic tire according to claim 4, wherein the second block has a shape with a tip end and has a taper cut portion at the tip end, wherein the second block has a land with a height H, and the taper cut portion has a height decreasing toward the tip end having a height h, wherein H>h, wherein a bridge portion is connected between the tip end of the second block and a sidewall surface of the first block, said bridge portion having a land portion with a substantially constant height equivalent to the height h.

10. The pneumatic tire according to claim 4, wherein the first block has generally a triangle shape when viewed from top.

11. The pneumatic tire according to claim 4, wherein the second block has generally a triangle shape when viewed from top.

12. The pneumatic tire according to claim 4, wherein the tread surface has a plurality of other blocks formed thereon, wherein the blocks and the other blocks have the same general configurations with their tip ends are directed away from each other.

13. The pneumatic tire according to claim 4, wherein the bridge portion is formed in such a manner that the bridge portion extends from the tip end in a direction perpendicular to the tapered direction of the first block.

* * * * *